(12) United States Patent
Mizusawa et al.

(10) Patent No.: US 9,294,336 B2
(45) Date of Patent: Mar. 22, 2016

(54) WIRELESS COMMUNICATION DEVICE, ROUTER, WIRELESS COMMUNICATION SYSTEM, AND WIRELESS COMMUNICATION METHOD

(75) Inventors: Nishiki Mizusawa, Kanagawa (JP); Kotaro Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 13/009,216

(22) Filed: Jan. 19, 2011

(65) Prior Publication Data

US 2011/0182275 A1 Jul. 28, 2011

(30) Foreign Application Priority Data

Jan. 27, 2010 (JP) .................................. 2010-015712

(51) Int. Cl.
*H04W 4/00* (2009.01)
*H04L 29/12* (2006.01)
*H04W 28/08* (2009.01)
*H04W 84/12* (2009.01)

(52) U.S. Cl.
CPC ...... *H04L 29/12952* (2013.01); *H04L 61/6077* (2013.01); *H04W 4/00* (2013.01); *H04W 28/08* (2013.01); *H04W 84/12* (2013.01)

(58) Field of Classification Search
CPC ..................... H04L 29/12952; H04L 61/6077
USPC .................................................. 370/328, 338
See application file for complete search history.

(56) References Cited

U.S. PATENT DOCUMENTS

| | | | |
|---|---|---|---|
| 2006/0171311 A1* | 8/2006 | Naik et al. | 370/229 |
| 2006/0234636 A1* | 10/2006 | Miller et al. | 455/67.11 |
| 2008/0070565 A1 | 3/2008 | Maeda | |
| 2011/0080868 A1* | 4/2011 | Krishnaswamy et al. | 370/328 |
| 2011/0103309 A1* | 5/2011 | Wang et al. | 370/328 |

FOREIGN PATENT DOCUMENTS

| | | |
|---|---|---|
| CN | 1589048 A | 3/2005 |
| CN | 101516066 A | 8/2009 |
| WO | WO 2006/054341 A1 | 5/2006 |

* cited by examiner

*Primary Examiner* — Shripal Khajuria
*Assistant Examiner* — Farhad Ali
(74) *Attorney, Agent, or Firm* — Sony Corporation

(57) ABSTRACT

Provided is a router including a network interface that communicates with a network, a first communication interface that communicates with a mobile communication interface of a wireless communication device through a mobile communication control station, a second communication interface that communicates with a wireless LAN interface of the wireless communication device through a wireless LAN control station, and a conversion unit that converts an origin address of one of data to the network received from the mobile communication interface and data to the network received from the wireless LAN interface into an origin address of another one of the data.

18 Claims, 9 Drawing Sheets

| FIRST IP ADDRESS | SECOND IP ADDRESS | DISTRIBUTION STATUS | COMBINATION STATUS |
|---|---|---|---|
| xxxx (MOBILE PHONE INTERFACE) | yyyy (WIRELESS LAN INTERFACE) | ENABLE | ENABLE |

WIRELESS COMMUNICATION DEVICE, ROUTER, WIRELESS COMMUNICATION SYSTEM, AND WIRELESS COMMUNICATION METHOD

BACKGROUND OF THE INVENTION

1. Field of the Invention

The present invention relates to a wireless communication device, a router, a wireless communication system, and a wireless communication method.

2. Description of the Related Art

In recent years, various wireless access schemes such as wireless LAN (Local Area Network) standardized by IEEE (Institute of Electrical and Electronics Engineers) 802.11a/b/g/n, UMTS (Universal Mobile Telecommunications System), and mobile communications systems like WiMAX are put to practical use and become widespread.

A wireless communication device with a wireless LAN interface can be connected to the Internet indoors through a wireless LAN access point connected to a broadband line (hereinafter referred to as a BB line) such as ADSL (Asymmetric Digital Subscriber Line), FTTH (Fiber To The Home) or CATV (Cable TeleVision).

Further, a wireless communication device with a mobile communication interface such as a mobile phone can be connected to the Internet through an indoor type small-sized base station ((hereinafter referred to as a femtocell base station) of a mobile phone such as UMTS or WiMAX connected to a BB line. Note that the femtocell is described in International Patent Publication No. 2006/54341, for example.

Although wireless communication schemes are highly developed in this manner, a transmission rate of a wireless communication path is generally about ⅒ that of a wired communication path. Therefore, when a wireless base station such as a femtocell base station or a wireless LAN access point is connected to the Internet through a BB line, the throughput between a wireless communication device and the Internet is limited by the throughput in the wireless communication path.

On the other hand, wireless communication devices having both a wireless LAN interface and a mobile communication interface are widespread, and such wireless communication devices can selectively use a plurality of wireless access schemes according to usage when they are located in an area where a plurality of wireless base stations such as a femtocell base station and a wireless LAN access point are available.

For example, in a mobile phone scheme standardized by 3GPP, handover between a UMTS and a wireless LAN is specified, and a wireless communication device (UMA/GAN) conforming to the mobile phone scheme can switch whether to use a mobile phone or a wireless LAN for data communication of one application according to radio conditions.

SUMMARY OF THE INVENTION

However, although the above-described mobile phone scheme enables selective use of a plurality of wireless access schemes, it does not enable data communication of one application by a plurality of wireless access schemes. There is thus a concern that the throughput of data communication is limited to the throughput of any wireless access scheme.

In light of the foregoing, it is desirable to provide novel and improved wireless communication device, router, wireless communication system, and wireless communication method capable of improving throughput by utilization of a plurality of wireless access schemes.

According to an embodiment of the present invention, there is provided a wireless communication device including a mobile communication interface that communicates with a network through a mobile communication control station and a router, a wireless LAN interface that communicates with the network through a wireless LAN control station and the router, and a distributing unit that distributes data to be transmitted to the network into data to be transmitted from the mobile communication interface and data to be transmitted from the wireless LAN interface.

The mobile communication interface or the wireless LAN interface may transmit address information of the mobile communication interface and address information of the wireless LAN interface in association with each other to the router.

The distributing unit may start distribution after the mobile communication interface or the wireless LAN interface transmits the address information to the router.

The distributing unit may set a distribution ratio of the data to be transmitted to the network depending on a relationship between a communication quality when using the mobile communication interface and a communication quality when using the wireless LAN interface.

According to another embodiment of the present invention, there is provided a wireless communication device including a mobile communication interface that communicates with a network through a mobile communication control station and a router, a wireless LAN interface that communicates with the network through a wireless LAN control station and the router, and a combining unit that acquires data transmitted from the network, addressed to one of the mobile communication interface and the wireless LAN interface and distributed by the router into transfer data addressed to the mobile communication interface and transfer data addressed to the wireless LAN interface by combining the transfer data received by the mobile communication interface and the transfer data received by the wireless LAN interface.

According to another embodiment of the present invention, there is provided a router including a network interface that communicates with a network, a first communication interface that communicates with a mobile communication interface of a wireless communication device through a mobile communication control station, a second communication interface that communicates with a wireless LAN interface of the wireless communication device through a wireless LAN control station, and a conversion unit that converts an origin address of one of data to the network received from the mobile communication interface and data to the network received from the wireless LAN interface into an origin address of another one of the data.

The first communication interface or the second communication interface may receive address information of the mobile communication interface and address information of the wireless LAN interface from the wireless communication device, the router may further include a storage unit that stores the address information of the mobile communication interface and the address information of the wireless LAN interface in association with each other, and when one address information stored in the storage unit is described in an origin address of received data, the conversion unit may convert the origin address of the data into another address information stored in the storage unit.

Said another address information may be address information of one of the mobile communication interface and the wireless LAN interface of the wireless communication device recognized in a destination of the data to the network.

According to another embodiment of the present invention, there is provided a router including a network interface that communicates with a network, a first communication interface that communicates with a mobile communication interface of a wireless communication device through a mobile communication control station, a second communication interface that communicates with a wireless LAN interface of the wireless communication device through a wireless LAN control station, and a distributing unit that, upon receiving data addressed to one of the mobile communication interface and the wireless LAN interface of the wireless communication device from the network by the network interface, distributes the data into data to be transferred from the first communication interface to the mobile communication interface and data to be transferred from the second communication interface to the wireless LAN interface.

The first communication interface or the second communication interface may receive address information of the mobile communication interface and address information of the wireless LAN interface from the wireless communication device, the router may further include a storage unit that stores the address information of the mobile communication interface and the address information of the wireless LAN interface in association with each other, and when any address information stored in the storage unit is described in a destination address of the data received from the network, the distributing unit may distribute the data.

The distributing unit may set a distribution ratio of the data received from the network depending on a relationship between a communication quality when using the first communication interface and a communication quality when using the second communication interface.

The distributing unit may start distribution in response to a request from the wireless communication device and ends the distribution in response to a request from the wireless communication device.

According to another embodiment of the present invention, there is provided a wireless communication system including a wireless communication device, including a mobile communication interface that communicates with a network through a mobile communication control station, a wireless LAN interface that communicates with the network through a wireless LAN control station, and a distributing unit that distributes data to be transmitted to the network into data to be transmitted from the mobile communication interface and data to be transmitted from the wireless LAN interface, and, a router including, a network interface that communicates with the network, a first communication interface that communicates with the mobile communication interface of the wireless communication device through the mobile communication control station, a second communication interface that communicates with the wireless LAN interface of the wireless communication device through the wireless LAN control station, and a conversion unit that converts an origin address of one of data to the network received from the mobile communication interface and data to the network received from the wireless LAN interface into an origin address of another one of the data.

According to another embodiment of the present invention, there is provided a wireless communication system including a wireless communication device, including a mobile communication interface that communicates with a network through a mobile communication control station, and a wireless LAN interface that communicates with the network through a wireless LAN control station, and a router including, a network interface that communicates with the network, a first communication interface that communicates with the mobile communication interface of the wireless communication device through the mobile communication control station, a second communication interface that communicates with the wireless LAN interface of the wireless communication device through the wireless LAN control station, and a distributing unit that, upon receiving data addressed to one of the mobile communication interface and the wireless LAN interface of the wireless communication device from the network by the network interface, distributes the data into data to be transferred from the first communication interface to the mobile communication interface and data to be transferred from the second communication interface to the wireless LAN interface. The wireless communication device may further include a combining unit that acquires data transmitted from the network by combining the data transferred from the first communication interface to the mobile communication interface and the data transferred from the second communication interface to the wireless LAN interface.

According to another embodiment of the present invention, there is provided a wireless communication method in a wireless communication device including a mobile communication interface that communicates with a network through a mobile communication control station and a router, and a wireless LAN interface that communicates with the network through a wireless LAN control station and the router, including a step of distributing data to be transmitted to the network into data to be transmitted from the mobile communication interface and data to be transmitted from the wireless LAN interface.

According to another embodiment of the present invention, there is provided a wireless communication method in a wireless communication device including a mobile communication interface that communicates with a network through a mobile communication control station and a router, and a wireless LAN interface that communicates with the network through a wireless LAN control station and the router, including a step of acquiring data transmitted from the network, addressed to one of the mobile communication interface and the wireless LAN interface and distributed by the router into transfer data addressed to the mobile communication interface and transfer data addressed to the wireless LAN interface by combining the transfer data received by the mobile communication interface and the transfer data received by the wireless LAN interface.

According to another embodiment of the present invention, there is provided a wireless communication device including a first communication interface that communicates with a network through a router, a second communication interface that communicates with the network through the router, and a distributing unit that distributes data to be transmitted to the network into data to be transmitted from the first communication interface and data to be transmitted from the second communication interface.

According to another embodiment of the present invention, there is provided a wireless communication device including a first communication interface that communicates with a network through a router, a second communication interface that communicates with the network through the router, and a combining unit that acquires data transmitted from the network, addressed to one of the first communication interface and the second communication interface and distributed by the router into transfer data addressed to the first communication interface and transfer data addressed to the second communication interface by combining the transfer data received by the first communication interface and the transfer data received by the second communication interface.

According to the embodiments of the present invention described above, it is possible to improve throughput by utilization of a plurality of wireless access schemes.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Configuration of Wireless Communication System
2. Configuration of Wireless Communication Device
3. Configuration of Router
4. Operation of Router
(At Time of Downloading: Distribute Process)
(At Time of Uploading: Combine Process)
5. Operation of Wireless Communication System
(Operation at Time of Downloading)
(Operation at Time of Uploading)
6. Summary <1. Configuration of Wireless Communication System>

Figure 1:
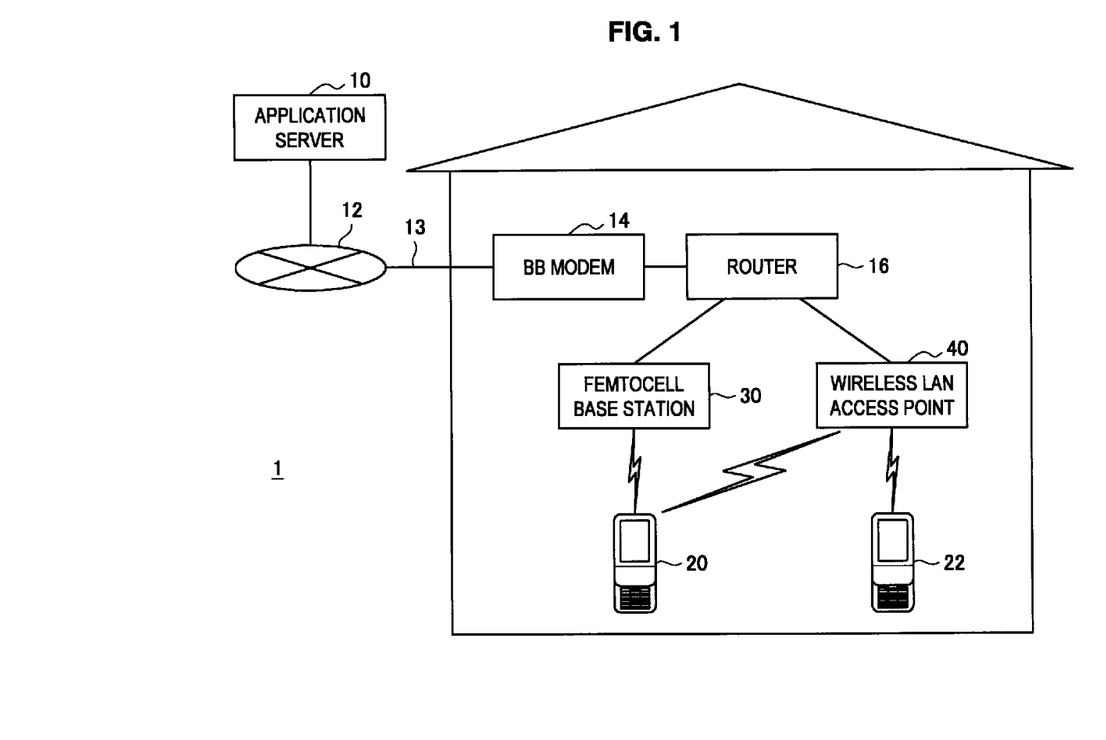
FIG. 1 is an explanatory view showing a configuration of a wireless communication system according to an embodiment of the present invention.

A configuration of a wireless communication system 1 according to an embodiment of the present invention is described first with reference to FIG. 1.

FIG. 1 is an explanatory view showing a configuration of a wireless communication system 1 according to an embodiment of the present invention. Referring to FIG. 1, the wireless communication system 1 according to the embodiment of the present invention includes an application server 10, the Internet 12, a BB line 13, a BB modem 14, a router 16, a wireless communication device 20, a wireless communication device 22, a femtocell base station 30, and a wireless LAN access point 40.

The femtocell base station (mobile communication control station) 30, which is an example of mobile communication base stations, is an indoor type small-sized base station compatible with the UMTS mobile phone wireless scheme standardized by 3GPP, for example, and can be connected with the wireless communication device 20 having a mobile phone interface compatible with the UMTS.

The wireless LAN access point 40 (wireless LAN base station, i.e. wireless LAN control station) is an access point compatible with the wireless LAN scheme such as IEE802.11a/b/g/n, for example, and can be connected with the wireless communication device 20 and the wireless communication device 22 having a wireless LAN interface.

Further, the femtocell base station 30 and the wireless LAN access point 40 are connected to the Internet 12 through the router 16, the BB (broadband) modem 14, and the BB line 13.

It should be noted that, although the case where the wireless communication system 1 is configured based on the mobile phone wireless standard and the wireless LAN standard is described in this specification, the wireless communication system 1 may be configured based on another wireless communication standard using IP packets. For example, the wireless communication system 1 may be configured based on WiMAX (Worldwide Interoperability for Microwave Access) or Bluetooth (registered trademark).

The wireless communication device 20 has a mobile phone interface and a wireless LAN interface. Therefore, when the wireless communication device 20 is located in the position where it is connectable with both of the femtocell base station 30 and the wireless LAN access point 40, it can perform data communication through the femtocell base station 30 by the mobile phone wireless standard and through the wireless LAN access point 40 by the wireless LAN standard. Note that, during the period when no application is running, the wireless communication device 20 is in standby mode as a mobile phone terminal.

On the other hand, the wireless communication device 22 does not have a mobile phone interface and has a wireless LAN interface. Therefore, when the wireless communication device 22 is located in the position where it is connectable with the wireless LAN access point 40, it can perform data communication through the wireless LAN access point 40 by the wireless LAN standard.

The application server 10 executes a given application in response to a request from the wireless communication device 20 (a user device such as the wireless communication device 20 or the wireless communication device 22) and transmits an execution result to the wireless communication device 20. Thus, download communication from the application server 10 to the wireless communication device 20 and upload communication from the wireless communication device 20 to the application server 10 occur between the application server 10 and the wireless communication device 20. Examples of applications include game, AR, teleconference, information retrieval, playback of contents such as music and video and so on.

In the above-described wireless communication system 1, the router 16 distributes packets which are transmitted as download data from the application server 10 to the wireless communication device 20 to a communication path through the femtocell base station 30 and a communication path through the wireless LAN access point 40. Therefore, the wireless communication device 20 can acquire the download data transmitted from the application server 10 by combining packets received respectively from the femtocell base station 30 and the wireless LAN access point 40 into a correct sequence.

Further, upload data from the wireless communication device 20 to the application server 10 can be also transmitted using the communication path through the femtocell base station 30 and the communication path through the wireless LAN access point 40. In this manner, the wireless communication system 1 according to the embodiment of the present invention transfers packets by using a plurality of communication paths and a plurality of wireless access schemes in combination, so that the overall throughput can be improved. Hereinafter, the configurations of the wireless communication device 20 and the router 16 that constitute the wireless communication system 1 are described in detail.

<2. Configuration of Wireless Communication Device>

Figure 2:
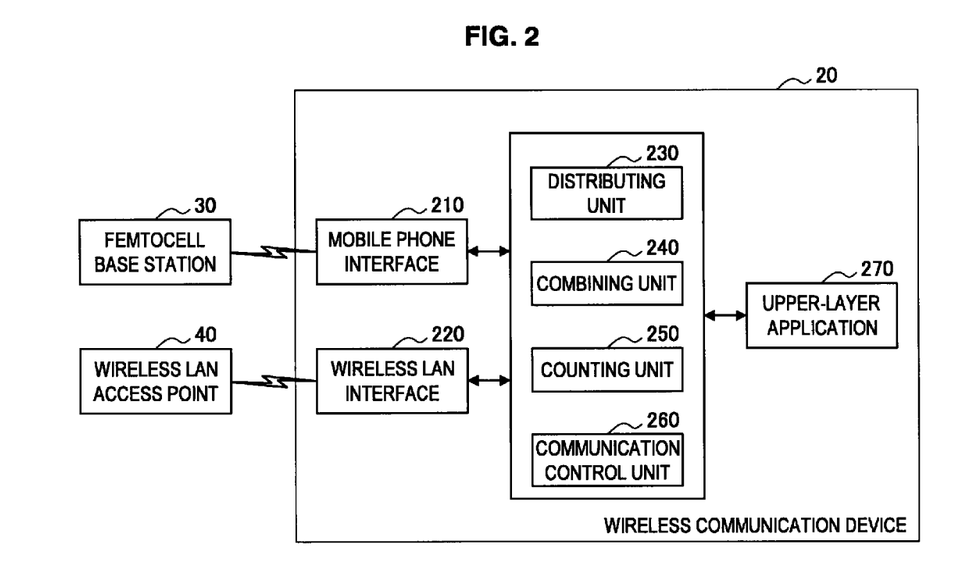
FIG. 2 is an explanatory view showing a configuration of a wireless communication device.

FIG. 2 is an explanatory view showing the configuration of the wireless communication device 20. Referring to FIG. 2, the wireless communication device 20 includes a mobile phone interface 210, a wireless LAN interface 220, a distributing unit 230, a combining unit 240, a counting unit 250, a communication control unit 260, and an application processing unit 270.

The mobile phone interface 210 is a mobile communication interface for making connection with the femtocell base station 30. The wireless LAN interface 220 is a communication interface for making connection with the wireless LAN access point 40.

Note that, when the wireless communication device 20 camps on the femtocell formed by the femtocell base station 30, it acquires connection information (SSID, WEP key etc.) of the wireless LAN access point 40 which is available in the current position from the femtocell base station 30. The wireless communication device 20 can thereby start a process for making connection between the wireless LAN interface 220 and the wireless LAN access point 40 at a given point of time, such as upon start of the application processing unit 270, for example. Note that the wireless communication device 20 may hold a table in which cell information of the femtocell and connection information of the wireless LAN are stored in association with each other and specify the connection information of the wireless LAN based on the information received from the femtocell base station 30.

The application processing unit 270 executes an application in cooperation with the application server 10. The application processing unit 270 inputs and outputs upload data to the application server 10 or download data from the application server 10 for execution of the application.

The distributing unit 230 is an element that is used mainly when transmitting upload data to the application server 10. Specifically, the distributing unit 230 distributes the upload data to the application server 10 into a transmission packet from the mobile phone interface 210 and a transmission packet from the wireless LAN interface 220. The mobile phone interface 210 and the wireless LAN interface 220 respectively transmit the distributed packets.

Further, the distributing unit 230 may optimize the distribution ratio of the upload data as appropriate. For example, the distributing unit 230 may compare the ratio of packets which have reached the router 16 through the respective paths with the distribution ratio and reduce the distribution ratio to the path in which the reach ratio is lower than the distribution ratio. It is thereby possible to distribute more packets to the path with a lower packet loss factor. Note that the ratio of packets which have reached the router 16 through the respective paths may be calculated by the router 16 and fed back from the router 16 as a quality report.

In the case where the number of terminals which use the wireless LAN access point 40, such as the wireless communication device 22 shown in FIG. 1, increases, for example, the resource of the wireless LAN tends to be insufficient. In such a case, the overall throughput may be further improved by optimizing the distribution ratio according to circumstances such as increasing the distribution ratio of the transmission packets from the mobile phone interface 210.

The combining unit 240 is an element that is used mainly when receiving download data from the application server 10. Specifically, the combining unit 240 combines packets distributed by the router 16 and received by the mobile phone interface 210 and packets distributed by the router 16 and received by the wireless LAN interface 220 into a correct sequence and thereby acquires download data.

The counting unit 250 is an element that is used mainly when receiving download data from the application server 10. Specifically, the counting unit 250 counts the number of packets distributed by the router 16 and received by the mobile phone interface 210 and the number of packets distributed by the router 16 and received by the wireless LAN interface 220. The number of packets counted by the counting unit 250 is transmitted to the router 16 as a quality report.

The communication control unit 260 creates, translates, and gives instruction to send various control messages and thereby controls the overall communication by the wireless communication device 20. For example, the communication control unit 260 creates and gives instruction to send a distribute start request message, a distribute end request message, a combine start request message, and a combine end request message.

The distribute start request message is a message that requests the router 16 to distribute the download data from the application server 10 into a packet addressed to the mobile phone interface 210 and a packet addressed to the wireless LAN interface 220. Further, the distribute end request message is a message that requests the router 16 to end the distribution of the download data from the application server 10.

The combine start request message is a message that requests the router 16 to unify origin addresses of packets addressed to the application server 10 which are transmitted from the mobile phone interface 210 and the wireless LAN interface 220 into an address of the mobile phone interface 210 or the wireless LAN interface 220. Further, the combine end request message is a message that requests the router 16 to end the address unification.

Note that the distribute start request message, the combine start request message and so on described above may contain IP addresses of the mobile phone interface 210 and the wireless LAN interface 220 as address information of the mobile phone interface 210 and the wireless LAN interface 220.

21 3. Configuration of Router>

The configuration of the wireless communication device 20 is described above with reference to FIG. 2. Hereinafter, the configuration of the router 16 according to the embodiment of the present invention is described with reference to FIG. 3.

Figure 3:
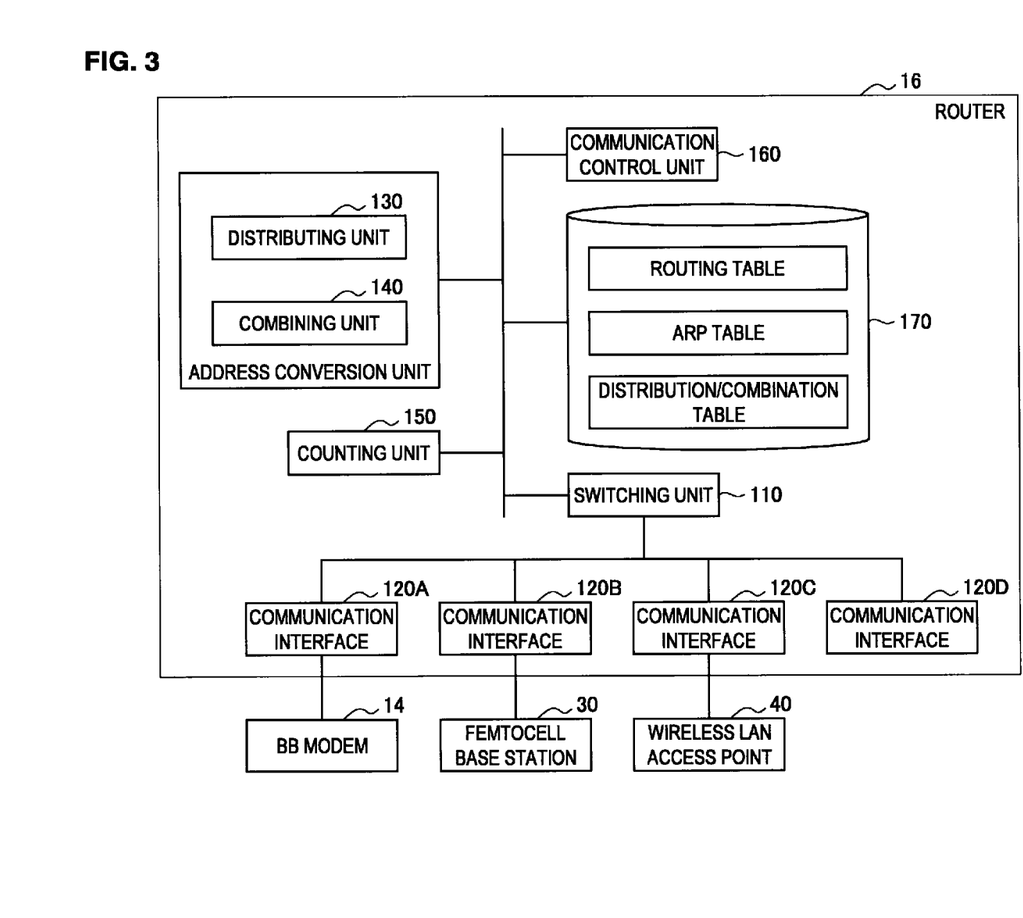
FIG. 3 is an explanatory view showing a configuration of a router.

FIG. 3 is an explanatory view showing the configuration of the router 16. Referring to FIG. 3, the router 16 includes a switching unit 110, communication interfaces 120A to 120D, an address conversion unit composed of a distributing unit 130 and a combining unit 140, a counting unit 150, a communication control unit 160, and a storage unit 170.

The communication interface 120A is a network interface that is connected with the Internet 12 through the BB modem 14. The communication interface 120B is connected with the femtocell base station 30, and the communication interface 120C is connected with the wireless LAN access point 40. The router 16 transmits and receives IP packets shown in FIG. 4 through such communication interfaces.

Figure 4:
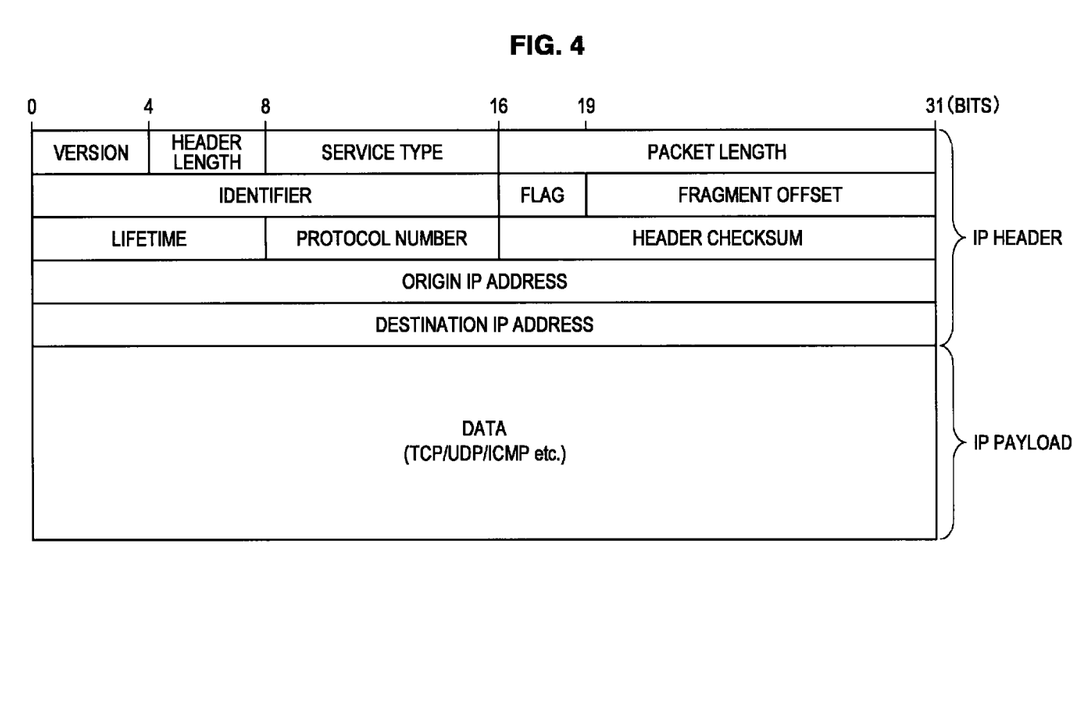
FIG. 4 is an explanatory view showing an exemplary structure of an IP packet.

FIG. 4 is an explanatory view showing an exemplary structure of an IP packet. Referring to FIG. 4, an IP packet is composed of an IP header and an IP payload, and the IP header includes an origin IP address indicating a transmission source of the IP packet, and a destination IP address indicating a destination of the IP packet. For example, in an IP packet addressed to the mobile phone interface 210 of the wireless communication device 20 which is transmitted from the application server 10, an IP address of the application server 10 is described in the origin IP address, and an IP address of the mobile phone interface 210 is described in the destination IP address.

The communication control unit 160 controls the overall communication by the router 16. For example, upon receiving an IP packet, the communication control unit 160 specifies a transfer destination of the IP packet based on a routing table stored in the storage unit 170 and processes a MAC address according to an ARP (Address Resolution Protocol) table.

Further, the communication control unit 160 updates a distribute/combine table in response to a message from the wireless communication device 20. For example, upon receiving the distribute start request message from the wireless communication device 20, the communication control unit 160 adds IP addresses of the mobile phone interface 210 and the wireless LAN interface 220 contained in the distribute start request message in association with each other to the distribute/combine table. At this time, the communication control unit 160 sets a distribute status to Enable. Note that, when the IP addresses of the mobile phone interface 210 and the wireless LAN interface 220 contained in the distribute start request message are already included in the distribute/combine table, the communication control unit 160 may only set the distribute status to Enable.

On the other hand, upon receiving the distribute end request message from the wireless communication device 20, the communication control unit 160 deletes the IP addresses of the mobile phone interface 210 and the wireless LAN interface 220 from the distribute/combine table. Note that the communication control unit 160 may only change the distribute status to Disable in the distribute/combine table rather than deleting the IP addresses.

Likewise, upon receiving the combine start request message from the wireless communication device 20, the communication control unit 160 adds IP addresses of the mobile phone interface 210 and the wireless LAN interface 220 contained in the combine start request message in association with each other to the distribute/combine table. At this time, the communication control unit 160 sets a combine status to Enable. Then, upon receiving the combine end request message from the wireless communication device 20, the communication control unit 160 deletes the IP addresses of the mobile phone interface 210 and the wireless LAN interface 220 from the distribute/combine table.

Figure 5:
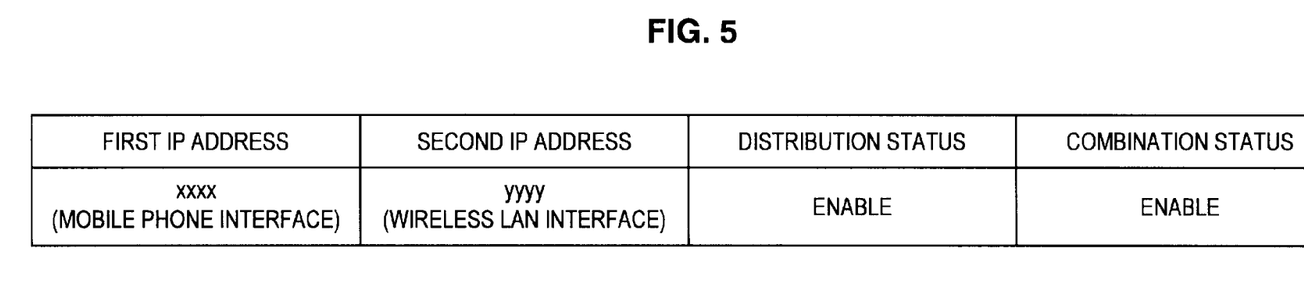
FIG. 5 is an explanatory view showing a specific example of a distribute/combine table.

FIG. 5 is an explanatory view showing a specific example of the above-described distribute/combine table. In the example shown in FIG. 5, the IP address "xxxx" of the mobile phone interface 210 and the IP address "yyyy" of the wireless LAN interface 220 are associated, and the distribute status and the combine status are both set to Enable.

The distributing unit 130 is an element that is used mainly when download data is transmitted from the application server 10 to the wireless communication device 20. The distributing unit 130 refers to the distribute/combine table and distributes an IP packet addressed to one of the IP addresses included in the distribute/combine table into IP packets addressed to both of the IP addresses included in the distribute/combine table.

For example, when an IP packet in which "xxxx" is described in the destination IP address is received from the application server 10, the distributing unit 130 converts the destination IP address of a part of the IP packet into the IP address "yyyy" of the wireless LAN interface 220. The IP packet transmitted from the application server 10 can be thereby distributed to the communication path through the femtocell base station 30 and the communication path through the wireless LAN access point 40.

Further, the distributing unit 130 may optimize the distribution ratio of the download data according to communication environment. For example, the distributing unit 130 may compare the ratio of packets which have reached the wireless communication device 20 through the respective paths with the distribution ratio and reduce the distribution ratio to the path in which the reach ratio is lower than the distribution ratio. It is thereby possible to distribute more packets to the path with a lower packet loss factor. Note that the ratio of packets which have reached the wireless communication device 20 through the respective paths may be calculated by the wireless communication device 20 and fed back from the wireless communication device 20 as a quality report.

In the case where the number of terminals which use the wireless LAN access point 40, such as the wireless communication device 22 shown in FIG. 1, increases, for example, the resource of the wireless LAN tends to be insufficient. In such a case, the overall throughput may be further improved by optimizing the distribution ratio according to communication environment such as increasing the distribution ratio to the communication path through the femtocell base station 30.

Further, although the case where the communication environment is grasped based on the feedback from the wireless communication device 20 is described above, the communication environment may be grasped by other ways. For example, the router 16 may grasp the conditions of the respective communication paths by analyzing ACK transmitted from the wireless communication device 20, measuring a packet transfer delay or the like.

The combining unit 140 is an element that is used mainly when upload data is transmitted from the wireless communication device 20 to the application server 10. The combining unit 140 refers to the distribute/combine table and, when one of the IP addresses included in the distribute/combine table is described in the origin IP address, converts the origin IP address into another IP address. Specifically, the combining unit 140 unifies the origin IP addresses of the IP packets transmitted from the wireless communication device 20.

For example, the combining unit 140 converts the origin IP address of an IP packet transmitted from the wireless LAN interface 220 of the wireless communication device 20 into an IP address of the mobile phone interface 210 of the wireless communication device 20. In this way, even when the application server 10 grasps only the IP address of the mobile phone interface 210 of the wireless communication device 20, the application server 10 can normally perform a receiving process.

The counting unit 150 is an element that is used mainly when upload data is transmitted from the wireless communication device 20 to the application server 10. Specifically, the counting unit 150 counts the number of packets distributed by the wireless communication device 20 and received through the femtocell base station 30 and the number of packets distributed by the wireless communication device 20 and received through the wireless LAN access point 40. The number of packets counted by the counting unit 150 is transmitted to the wireless communication device 20 as a quality report.

<4. Operation of Router>

The configuration of the router 16 according to the embodiment of the present invention is described above. Hereinafter, the operation of the router 16 at the time of downloading and the operation of the router 16 at the time of uploading are described sequentially with reference to FIGS. 6 and 7.

(At Time of Downloading: Distribute Process)

Figure 6:
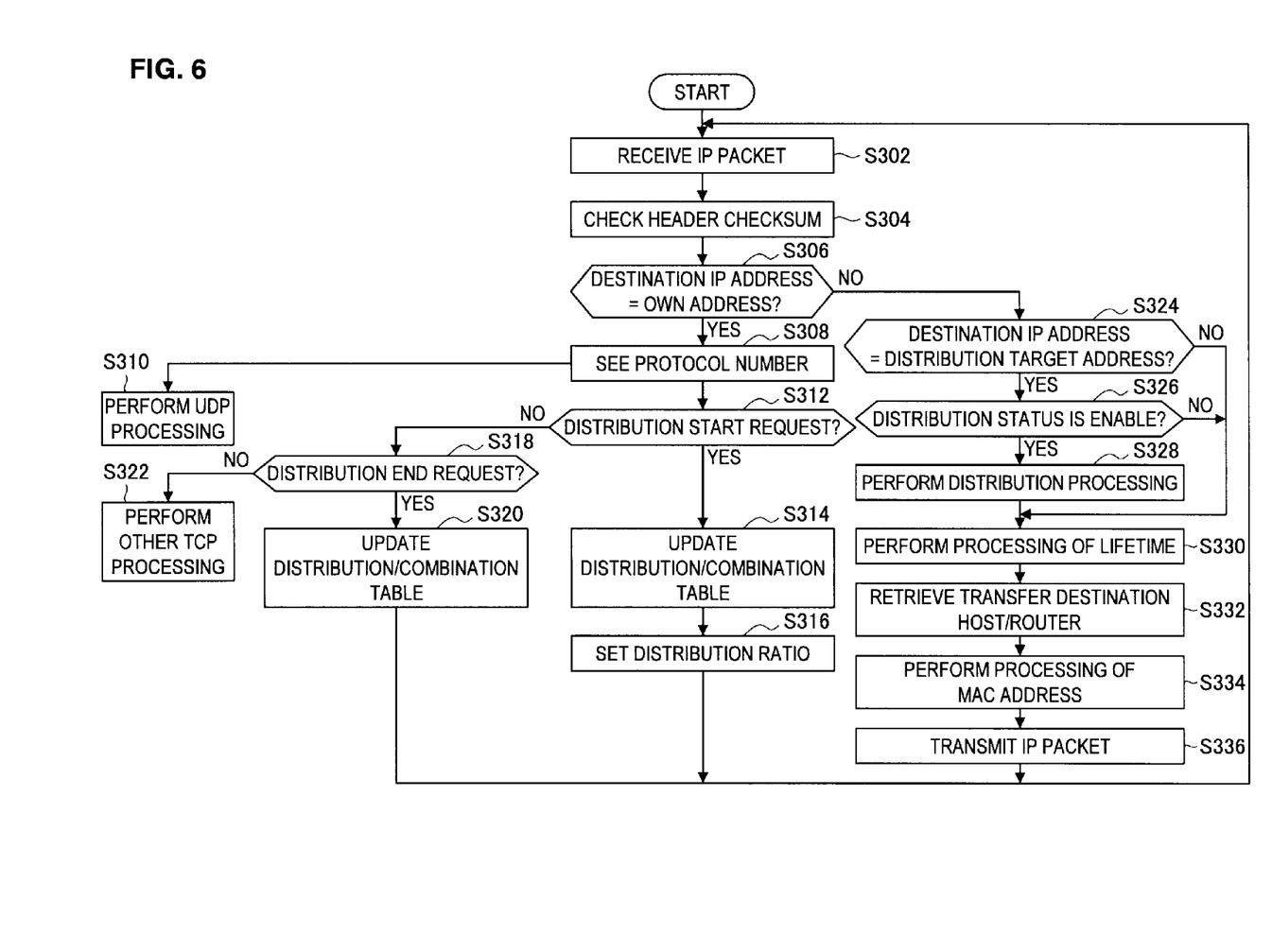
FIG. 6 is a flowchart showing an operation of a router assuming downloading from an application server to a wireless communication device.

FIG. 6 is a flowchart showing the operation of the router assuming downloading from the application server 10 to the wireless communication device 20. Referring to FIG. 6, when an IP packet is received by the communication interface 120, the communication control unit 160 checks header checksum (S304) and determines whether the destination IP address is the IP address of the router 16 (S306).

When the destination IP address is the IP address of the router 16, the communication control unit 160 sees a protocol number and performs UDP processing (S308, S310). Further, when the IP packet is a distribute start request (S312), the communication control unit 160 updates the distribute/combine table (S314). For example, the communication control unit 160 may add a plurality of IP addresses contained in the distribute start request in association to the distribute/combine table or set the distribute status to Enable. Further, the distributing unit 130 sets a distribution ratio (S316).

On the other hand, when the IP packet is a distribute end request (S318), the communication control unit 160 updates the distribute/combine table (S320). For example, the communication control unit 160 may delete a plurality of IP addresses contained in the distribute end request from the distribute/combine table or set the distribute status to Disable. Further, when the IP packet is neither a distribute start request nor a distribute end request, the communication control unit 160 performs other TCP processing (S322).

Further, when the destination IP address of the IP packet is not the IP address of the router 16 (S306) and is a distribute target address included in the distribute/combine table (S324), and the distribute status is Enable (S326), the distributing unit 130 performs distribute processing (S328). For example, the distributing unit 130 may convert the destination IP address in which the address of the mobile phone interface 210 is described into an address of the wireless LAN interface 220 at a predetermined ratio.

After that, the communication control unit 160 performs processing of lifetime (S330), retrieval of a transfer destination host/router (S332), processing of MAC address (S334) and so on, and then transmits the IP packet from any communication interface 120 (S336).

(At Time of Uploading: Combine Process)

Figure 7:
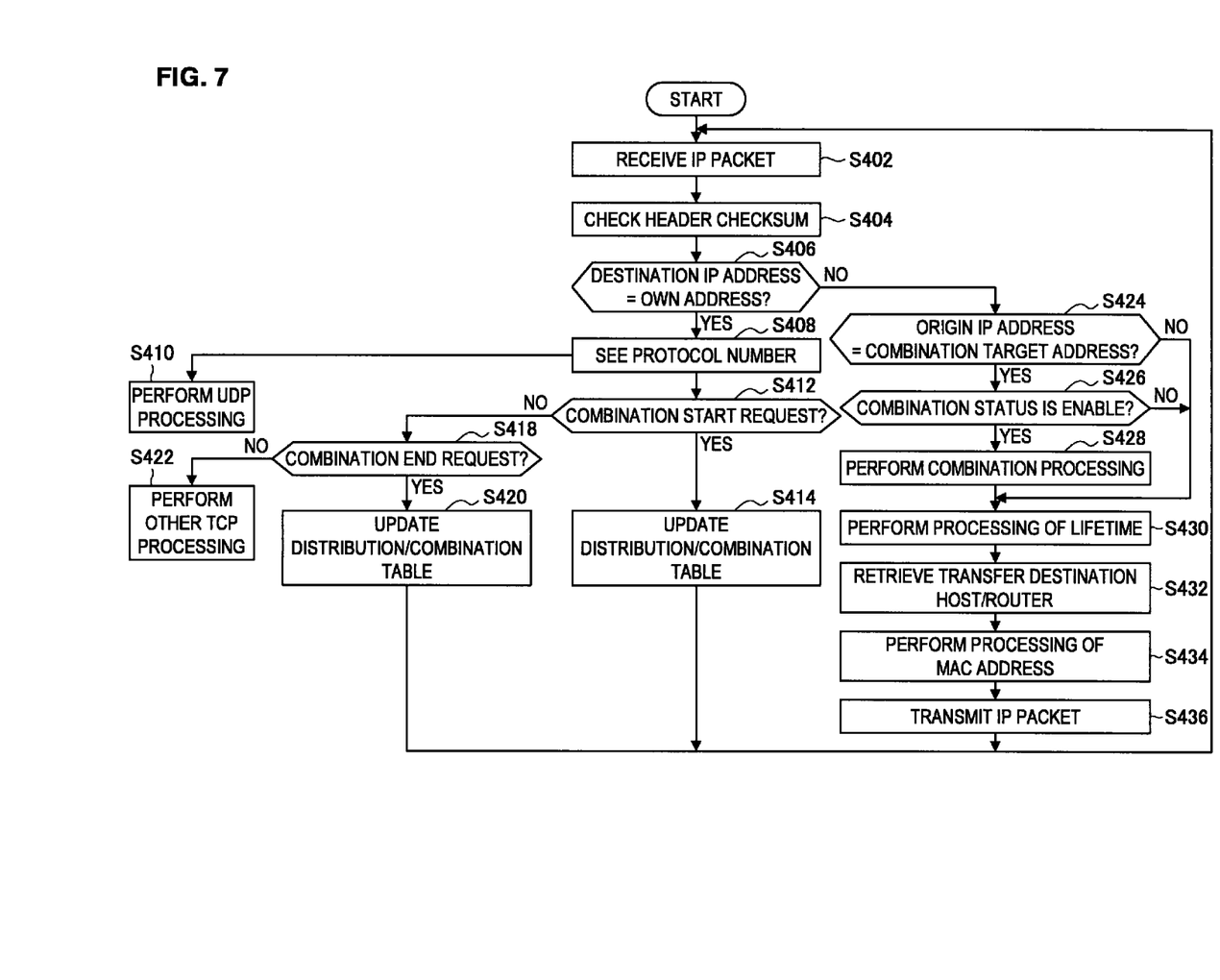
FIG. 7 is a flowchart showing an operation of a router assuming uploading from a wireless communication device to an application server.

FIG. 7 is a flowchart showing the operation of the router assuming uploading from the wireless communication device 20 to the application server 10. Referring to FIG. 7, when an IP packet is received by the communication interface 120, the communication control unit 160 checks header checksum (S404) and determines whether the destination IP address is the IP address of the router 16 (S406).

When the destination IP address is the IP address of the router 16, the communication control unit 160 sees a protocol number and performs UDP processing (S408, S410). Further, when the IP packet is a combine start request (S412), the communication control unit 160 updates the distribute/combine table (S414). For example, the communication control unit 160 may add a plurality of IP addresses contained in the combine start request in association to the distribute/combine table or set the combine status to Enable.

On the other hand, when the IP packet is a combine end request (S418), the communication control unit 160 updates the distribute/combine table (S420). For example, the communication control unit 160 may delete a plurality of IP addresses contained in the combine end request from the distribute/combine table or set the combine status to Disable. Further, when the IP packet is neither a combine start request nor a combine end request, the communication control unit 160 performs other TCP processing (S422).

Further, when the destination IP address of the IP packet is not the IP address of the router 16 (S406) and is a combine target address included in the distribute/combine table (S424), and the combine status is Enable (S426), the combining unit 140 performs combine processing (S428). For example, the combining unit 140 may convert the origin IP address of the IP packet transmitted from the wireless LAN interface 220 of the wireless communication device 20 into the IP address of the mobile phone interface 210 of the wireless communication device 20.

After that, the communication control unit 160 performs processing of lifetime (S430), retrieval of a transfer destination host/router (S432), processing of MAC address (S434) and so on, and then transmits the IP packet from any communication interface 120 (S436).

<5. Operation of Wireless Communication System>

The configurations of the wireless communication device 20 and the router 16 and the operation of the router 16 are described above. Hereinafter, the operation of the wireless communication system 1 at the time of downloading and the operation of the wireless communication system 1 at the time of uploading are described sequentially with reference to FIGS. 8 and 9.

(Operation at Time of Downloading)

Figure 8:
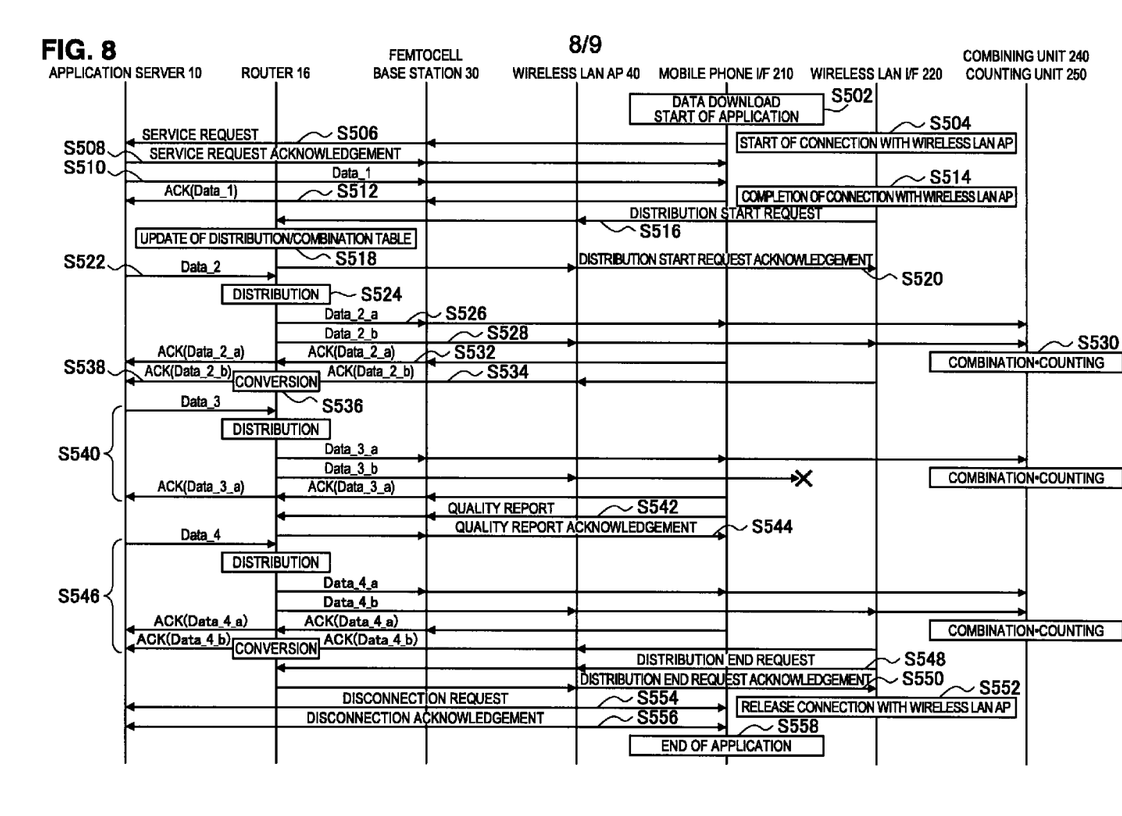
FIG. 8 is a sequence chart showing an operation of a wireless communication system at the time of downloading.

FIG. 8 is a sequence chart showing the operation of the wireless communication system 1 at the time of downloading. Referring to FIG. 8, when the wireless communication device 20 is in standby mode as a mobile phone terminal, if a data download application is started in the wireless communication device 20 (S502), the wireless LAN interface 220 starts a connection process with the wireless LAN access point 40 (S504).

On the other hand, by the start of the application, the wireless communication device 20 transmits a service request from the mobile phone interface 210 to the application server 10 (S506). After that, the application server 10 transmits a service request response to the mobile phone interface 210 (S508), and starts packet transmission of download data addressed to the mobile phone interface 210 (S510). Then, when a packet from the application server 10 is normally received by the mobile phone interface 210, the wireless communication device 20 transmits ACK from the mobile phone interface 210 to the application server 10 (S512).

Next, when connection of the wireless LAN interface 220 with the wireless LAN access point 40 is established (S514), the wireless communication device 20 transmits a distribute start request from the wireless LAN interface 220 to the router 16 (S516). Receiving the distribute start request, the router 16 adds the addresses of the mobile phone interface 210 and the wireless LAN interface 220 contained in the distribute start request to the distribute/combine table (S518), and transmits a distribute start request response (S520).

After that, when a packet (Data_2) addressed to the mobile phone interface 210 is transmitted from the application server 10 (S522), the distributing unit 130 of the router 16 converts the destination of a part of the packet into the IP address of the wireless LAN interface 220 based on the distribute/combine table (S524). Then, the router 16 transmits packets (Data_2_a, Data_2_b) to the mobile phone interface 210 and the wireless LAN interface 220, respectively (S526, S528).

Then, the combining unit 240 of the wireless communication device 20 combines the packet distributed by the router 16 and received by the mobile phone interface 210 and the packet distributed by the router 16 and received by the wireless LAN interface 220 into a correct sequence. Further, the counting unit 250 of the wireless communication device 20 counts the number of packets distributed by the router 16 and received by the mobile phone interface 210 and the number of packets distributed by the router 16 and received by the wireless LAN interface 220 (S530).

Further, the wireless communication device 20 transmits ACK from each of the mobile phone interface 210 and the wireless LAN interface 220 to the application server 10 (S532, S534).

Note that, although the IP address of the wireless LAN interface 220 is described in the origin address of the ACK transmitted from the wireless LAN interface 220, the application server 10 does not recognize the IP address of the wireless LAN interface 220. Thus, the router 16 converts the origin address of the ACK transmitted from the wireless LAN interface 220 into the IP address of the mobile phone interface 210 based on the distribute/combine table (S536) and transmits the data to the application server 10 (S538).

After that, substantially the same process as the process from S522 to S538 is repeated, though the occurrence of a packet loss is assumed in some cases (S540, S546). Note that, however, when the router 16 receives a quality report from the wireless communication device 20 (S542), the router 16 optimizes the distribution ratio of packets received from the application server 10 based on the quality report and transmits a quality report response to the wireless communication device 20 (S544).

Then, the wireless communication device 20 transmits a distribute end request to the router 16 (S548) and, upon receiving a distribute end request response from the router 16 (S550), releases the connection of the wireless LAN interface 220 with the wireless LAN access point (S552). Further, after a disconnection request and a disconnection response are transmitted and received between the mobile phone interface 210 of the wireless communication device 20 and the application server 10 (S554, S556), the application started in the step 5502 is ended (S558).

(Operation at Time of Uploading)

Figure 9:
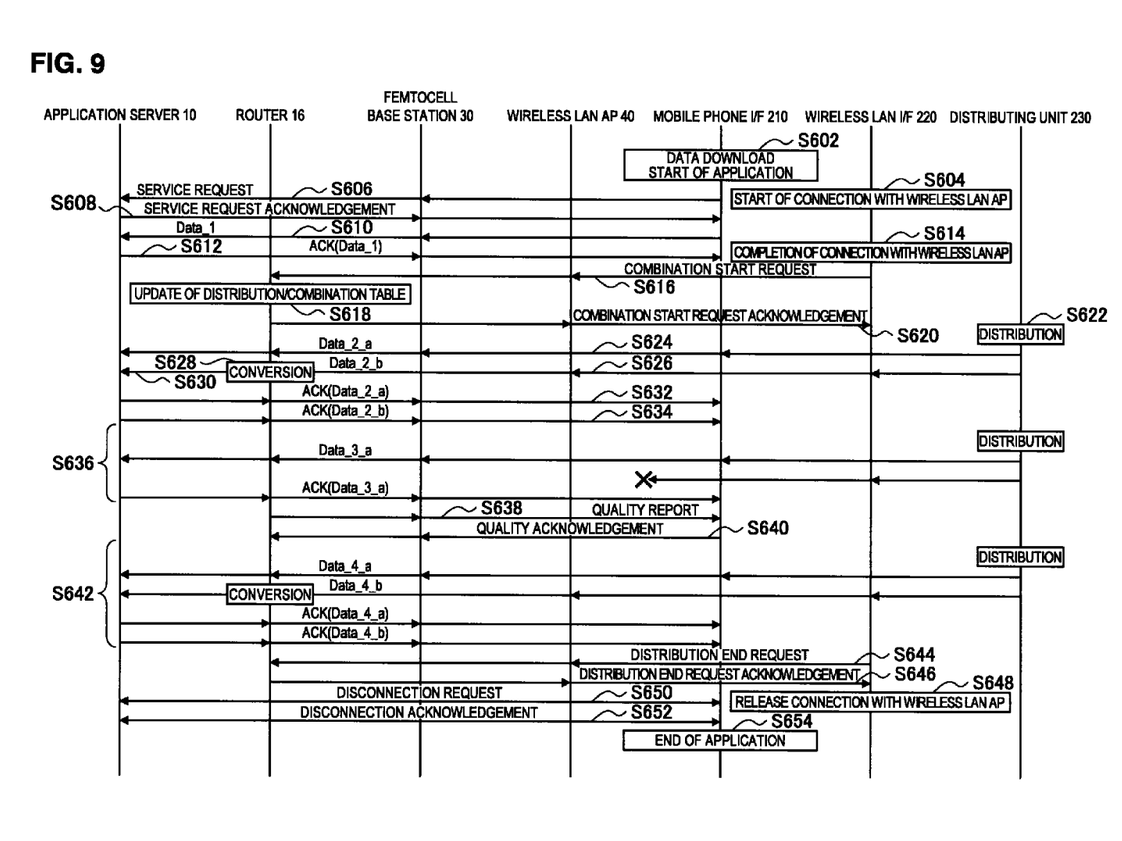
FIG. 9 is a sequence chart showing an operation of a wireless communication system at the time of uploading.

FIG. 9 is a sequence chart showing the operation of the wireless communication system 1 at the time of uploading. Referring to FIG. 9, when the wireless communication device 20 is in standby mode as a mobile phone terminal, if a data upload application is started in the wireless communication device 20 (S602), the wireless LAN interface 220 starts a connection process with the wireless LAN access point 40 (S604).

On the other hand, by the start of the application, the wireless communication device 20 transmits a service request from the mobile phone interface 210 to the application server 10 (S606). After that, when the wireless communication device 20 receives a service request response from the application server 10 (S608), starts packet transmission of upload data addressed to the application server 10 (S610). Then, when the application server 10 normally receives a packet from the mobile phone interface 210, the application server 10 transmits ACK to the mobile phone interface 210 (S612).

Next, when connection of the wireless LAN interface 220 with the wireless LAN access point 40 is established (S614), the wireless communication device 20 transmits a combine start request from the wireless LAN interface 220 to the router 16 (S616). Receiving the combine start request, the router 16 adds the addresses of the mobile phone interface 210 and the wireless LAN interface 220 contained in the combine start request to the distribute/combine table (S618), and transmits a combine start request response (S620).

After that, the distributing unit 230 of the wireless communication device 20 distributes the upload data to the application server 10 into a transmission packet from the mobile phone interface 210 and a transmission packet from the wireless LAN interface 220 (S622). Then, each of the mobile phone interface 210 and the wireless LAN interface 220 transmits the packets distributed by the distributing unit 230 to the application server 10 (S624, S626).

Note that, although the IP address of the wireless LAN interface 220 is described in the origin address of the packet transmitted from the wireless LAN interface 220, the application server 10 does not recognize the IP address of the wireless LAN interface 220. Thus, the router 16 converts the origin address of the packet transmitted from the wireless LAN interface 220 into the IP address of the mobile phone interface 210 based on the distribute/combine table (S628) and transmits the data to the application server 10 (S630).

After that, substantially the same process as the process from S622 to S630 is repeated, though the occurrence of a packet loss is assumed in some cases (S636, S642).

Note that, however, when the wireless communication device 20 receives a quality report from the router 16 (S638), the wireless communication device 20 optimizes the distribution ratio of packets to be transmitted to the application server 10 based on the quality report and transmits a quality report response to the router 16 (S640).

Then, the wireless communication device 20 transmits a combine end request to the router 16 (S644) and, upon receiving a combine end request response from the router 16 (S646), releases the connection of the wireless LAN interface 220 with the wireless LAN access point (S648). Further, after a disconnection request and a disconnection response are transmitted and received between the mobile phone interface 210 of the wireless communication device 20 and the application server 10 (S650, S652), the application started in the step S602 is ended (S654).

<6. Summary>

As described above, according to the embodiment of the present invention, the advantageous effects described below, for example, can be obtained.

Because the wireless communication device 20 can simultaneously perform data communication through a plurality of wireless base stations (the femtocell base station 30 and the wireless LAN access point 40), the bidirectional throughput is improved.

By optimizing the distribution ratio of packets to a plurality of communication paths according to the conditions and the communication qualities of the respective communication paths, the throughput of the entire domestic network, for example, can be improved.

Because the wireless LAN interface 220 is connected to the wireless LAN access point 40 triggered by the start of an application, power consumption can be suppressed. Note that, upon entering a communicating area of a femtocell, the wireless communication device 20 can acquire connection information with the wireless LAN access point 40 compatible with the femtocell.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the case where the router 16, the femtocell base station 30 and the wireless LAN access point 40 are configured independent of one another is described in the above-described embodiment, the present invention is not limited thereto. For example, the router 16 and the femtocell base station 30 may be configured integrally, the router 16 and the wireless LAN access point 40 may be configured integrally, or the router 16, the femtocell base station 30 and the wireless LAN access point 40 may be configured integrally.

Further, although the terms "download" and "upload" are used in the above description, the present invention is applicable to streaming communication.

Further, it is not always necessary to perform the steps in the processing of the wireless communication system 1 or the router 16 of this specification in chronological order according to the sequence shown in the sequence charts or flowcharts. For example, the steps in the processing of the router 16 may be processed in a different sequence from the sequence shown in the flowcharts or may be processed in parallel.

Furthermore, it is possible to create a computer program that causes hardware such as CPU, ROM and RAM incorporated in the router 16 or the wireless communication device 20 to perform the equal functions to the elements of the router 16 or the wireless communication device 20 described above. Further, a storage medium that stores such a computer program may be provided.

The present application contains subject matter related to that disclosed in Japanese Priority Patent Application JP 2010-15712 filed in the Japan Patent Office on Jan. 27, 2010, the entire content of which is hereby incorporated by reference.

What is claimed is:

1. A wireless communication device comprising:
a mobile communication interface configured to communicate with an application server via a network through a mobile communication control station and a router;
a wireless LAN interface configured to communicate with the application server through a wireless LAN control station and the router, wherein the mobile communication interface and/or the wireless LAN interface is configured to transmit to the router an IP-address of the mobile communication interface and an IP-address of the wireless LAN interface in association with each other; and
a distributing unit configured to distribute data for an application to be transmitted to the application server via a network into first data for the application to be transmitted from the mobile communication interface and second data for the application to be transmitted from the wireless LAN interface, wherein at least a portion of the first data is different from at least a portion of the second data.

2. The wireless communication device according to claim 1, wherein the distributing unit is further configured to start distribution after the mobile communication interface and/or the wireless LAN interface transmits the IP-addresses to the router.

3. The wireless communication device according to claim 1, wherein the distributing unit is further configured to set a distribution ratio of the data for the application to be transmitted to the application server depending on a relationship between a communication quality when using the mobile communication interface and a communication quality when using the wireless LAN interface.

4. The wireless communication device according to claim 1, wherein the distributing unit is further configured to set a distribution ratio of the data for the application to be transmitted to the application server depending on a ratio of a number of the first data having reached the router through the mobile communication interface to a number of the second data having reached the router through the wireless LAN interface.

5. A wireless communication device comprising:
a mobile communication interface configured to communicate with an application server via a network through a mobile communication control station and a router;
a wireless LAN interface configured to communicate with the application server through a wireless LAN control station and the router, wherein the mobile communication interface and/or the wireless LAN interface is configured to transmit to the router an IP-address of the mobile communication interface and an IP-address of the wireless LAN interface in association with each other; and
a combining unit configured to acquire data for an application transmitted from the application server via a network, addressed to one of the mobile communication interface and the wireless LAN interface and distributed by the router into first transfer data for the application addressed to the mobile communication interface and second transfer data for the application addressed to the wireless LAN interface by combining the first transfer data for the application received by the mobile communication interface and the second transfer data for the application received by the wireless LAN interface, wherein at least a portion of the first transfer data is different from at least a portion of the second transfer data.

6. A router comprising:
a network interface configured to communicate with an application server via a network;
a first communication interface configured to communicate with a mobile communication interface of a wireless communication device through a mobile communication control station;
a second communication interface configured to communicate with a wireless LAN interface of the wireless communication device through a wireless LAN control station, wherein the first communication interface and/or the second communication interface is configured to receive from the wireless communication device an IP-address of the mobile communication interface and an IP-address of the wireless LAN interface in association with each other; and
a conversion unit configured to convert a first origin address of one of first data for an application to the application server received from the mobile communication interface and second data for the application to the application server received from the wireless LAN interface into a second origin address of another one of the mobile communication interface and the wireless LAN interface of the wireless communication device, wherein at least a portion of the first data is different from at least a portion of the second data.

7. The router according to claim 6, wherein
the router further includes a storage unit configured to store the IP-address of the mobile communication interface and the IP-address of the wireless LAN interface in association with each other, and wherein the conversion unit is further configured to convert the first origin address into one IP-address stored in the storage unit when another IP-address stored in the storage unit is described in the first origin address.

8. The router according to claim 7, wherein said one IP-address is address information of one of the mobile communication interface and the wireless LAN interface of the wireless communication device recognized in a destination of the data for the application to the application server.

9. A router comprising:
a network interface configured to communicate with an application server via a network;
a first communication interface configured to communicate with a mobile communication interface of a wireless communication device through a mobile communication control station;
a second communication interface configured to communicate with a wireless LAN interface of the wireless communication device through a wireless LAN control station, wherein the first communication interface and/or the second communication interface is configured to receive from the wireless communication device an IP-address of the mobile communication interface and an IP-address of the wireless LAN interface in association with each other; and
a distributing unit configured to distribute, upon receiving data for an application addressed to one of the mobile communication interface and the wireless LAN interface of the wireless communication device from the application server by the network interface, the data for the application into first data for the application to be transferred from the first communication interface to the mobile communication interface and second data for the application to be transferred from the second communication interface to the wireless LAN interface, wherein at least a portion of the first data is different from at least a portion of the second data.

10. The router according to claim 9, wherein the router further includes a storage unit configured to store the IP-address of the mobile communication interface and the IP-address of the wireless LAN interface in association with each other, and
wherein the distributing unit is further configured to distribute the data for the application when any IP-address stored in the storage unit is described in a destination address of the data for the application received from the application server.

11. The router according to claim 10, wherein the distributing unit is further configured to set a distribution ratio of the data for the application received from the application server depending on a relationship between a communication quality when using the first communication interface and a communication quality when using the second communication interface.

12. The router according to claim 9, wherein the distributing unit is further configured to start distribution in response to a request from the wireless communication device and end the distribution in response to a request from the wireless communication device.

13. A wireless communication system comprising:
a wireless communication device including:
a mobile communication interface configured to communicate with an application server via a network through a mobile communication control station,
a wireless LAN interface configured to communicate with the application server through a wireless LAN control station, wherein the mobile communication interface and/or the wireless LAN interface is configured to transmit to a router an IP-address of the mobile communication interface and an IP-address of the wireless LAN interface in association with each other, and
a distributing unit configured to distribute data for an application to be transmitted to the application server into first data for the application to be transmitted from the mobile communication interface and second data for the application to be transmitted from the wireless LAN interface, wherein at least a portion of the first data is different from at least a portion of the second data; and
the router including:
a network interface configured to communicate with the application server, a first communication interface configured to communicate with the mobile communication interface of the wireless communication device through the mobile communication control station,
a second communication interface configured to communicate with the wireless LAN interface of the wireless communication device through the wireless LAN control station, wherein the first communication interface and/or the second communication interface is configured to receive from the wireless communication device the IP-address of the mobile communication interface and the IP-address of the wireless LAN interface in association with each other, and
a conversion unit configured to convert an origin address of one of data for the application to the application server received from the mobile communication interface and data for the application to the application server received from the wireless LAN interface into an origin address of another one of the mobile communication interface and the wireless LAN interface of the wireless communication device.

14. A wireless communication system comprising:
a wireless communication device including:
a mobile communication interface configured to communicate with an application server via a network through a mobile communication control station, and
a wireless LAN interface configured to communicate with the application server through a wireless LAN control station, wherein the mobile communication interface and/or the wireless LAN interface is configured to transmit to a router an IP-address of the mobile communication interface and an IP-address of the wireless LAN interface in association with each other; and
the router including:
a network interface configured to communicate with the application server, a first communication interface configured to communicate with the mobile communication interface of the wireless communication device through the mobile communication control station,
a second communication interface configured to communicate with the wireless LAN interface of the wireless communication device through the wireless LAN control station, wherein the first communication interface and/or the second communication interface is configured to receive from the wireless communication device the IP-address of the mobile communication interface and the IP-address of the wireless LAN interface in association with each other, and a distributing unit configured to distribute, upon receiving data for an application addressed to one of the mobile communication interface and the wireless LAN interface of the wireless communication device from the application server by the network interface, the data for the application into first data for the application to be transferred from the first communication interface to the mobile communication interface and second data for the application to be transferred from the second communication interface to the wireless LAN interface, wherein at least a portion of the first data is different from at least a portion of the second data, wherein the wireless communication device further includes a combining unit configured to acquire data for the application transmitted from the application server by combining the data for the application transferred from the first communication interface to the mobile communication interface and the data for the application transferred from the second communication interface to the wireless LAN interface.

15. A wireless communication method in a wireless communication device including a mobile communication interface configured to communicate with an application server via a network through a mobile communication control station and a router, and a wireless LAN interface configured to communicate with the application server through a wireless LAN control station and the router, the method comprising:

transmitting to the router an IP-address of the mobile communication interface and an IP-address of the wireless LAN interface in association with each other; and distributing data for an application to be transmitted to the application server into first data for the application to be transmitted from the mobile communication interface and second data for the application to be transmitted from the wireless LAN interface wherein at least a portion of the first data is different from at least a portion of the second data.

16. A wireless communication method in a wireless communication device including a mobile communication interface configured to communicate with an application server via a network through a mobile communication control station and a router, and a wireless LAN interface configured to communicate with the application server through a wireless LAN control station and the router, the method comprising:

transmitting to the router an IP-address of the mobile communication interface and an IP-address of the wireless LAN interface in association with each other; and acquiring data transmitted from the application server, addressed to one of the mobile communication interface and the wireless LAN interface and distributed by the router into first transfer data for an application addressed to the mobile communication interface and second transfer data for the application addressed to the wireless LAN interface by combining the first transfer data for the application received by the mobile communication interface and the second transfer data for the application received by the wireless LAN interface, wherein at least a portion of the first transfer data is different from at least a portion of the second transfer data.

17. A wireless communication device comprising:

a first communication interface configured to communicate with an application server via a network through a router;

a second communication interface configured to communicate with the application server through the router, wherein the first communication interface and/or the second communication interface is configured to transmit to the router an IP-address of the first communication interface and an IP-address of the second communication interface in association with each other; and a distributing unit configured to distribute data for an application to be transmitted to the application server into first data for the application to be transmitted from the first communication interface and second data for the application to be transmitted from the second communication interface, wherein at least a portion of the first data is different from at least a portion of the second data.

18. A wireless communication device comprising:

a first communication interface configured to communicate with an application server via a network through a router;

a second communication interface configured to communicate with the application server through the router, wherein the first communication interface and/or the second communication interface is configured to transmit to the router an IP-address of the first communication interface and an IP-address of the second communication interface in association with each other; and a combining unit configured to acquire data for an application transmitted from the application server, addressed to one of the first communication interface and the second communication interface and distributed by the router into first transfer data for the application addressed to the first communication interface and second transfer data for the application addressed to the second communication interface by combining the first transfer data for the application received by the first communication interface and the second transfer data for the application received by the second communication interface, wherein at least a portion of the first transfer data is different from at least a portion of the second transfer data.

* * * * *